(12) United States Patent
Chau

(10) Patent No.: US 9,107,442 B2
(45) Date of Patent: Aug. 18, 2015

(54) METHODS OF MAKING OXYGEN SCAVENGING ARTICLES CONTAINING MOISTURE

(75) Inventor: Chieh-Chun Chau, Victor, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 686 days.

(21) Appl. No.: 13/240,594

(22) Filed: Sep. 22, 2011

(65) Prior Publication Data

US 2013/0075655 A1  Mar. 28, 2013

(51) Int. Cl.
*A23L 3/3436* (2006.01)
*C09K 3/00* (2006.01)
*B26D 1/00* (2006.01)

(52) U.S. Cl.
CPC ................ *A23L 3/3436* (2013.01); *B26D 1/00* (2013.01)

(58) Field of Classification Search
CPC .................................................... A23L 3/3436
USPC .................................................... 252/188.28
See application file for complete search history.

(56) References Cited

U.S. PATENT DOCUMENTS

| | | | |
|---|---|---|---|
| 4,317,742 A | 3/1982 | Yamaji et al. | |
| 4,769,175 A | 9/1988 | Inoue | |
| 5,089,323 A | 2/1992 | Nakae et al. | |
| 5,725,795 A | 3/1998 | Kashiba | |
| 5,896,994 A | 4/1999 | Krebs | |
| 6,248,690 B1 | 6/2001 | McKedy | |
| 6,899,822 B2 | 5/2005 | McKedy | |
| 2001/0048096 A1 | 12/2001 | Sakamoto et al. | |
| 2005/0205841 A1 | 9/2005 | McKedy | |
| 2007/0020456 A1 | 1/2007 | Solovyov | |
| 2007/0037722 A1 | 2/2007 | Taoda | |
| 2010/0255231 A1 | 10/2010 | Chau et al. | |
| 2011/0177742 A1 | 7/2011 | Frederix et al. | |

FOREIGN PATENT DOCUMENTS

| | | |
|---|---|---|
| JP | 03-202150 A | 9/1991 |
| JP | 2010167696(A) | 5/2010 |

OTHER PUBLICATIONS

PCT International Search Report dated Feb. 13, 2013 in corresponding International Application No. PCT/US2012/056468 (3 pages).
Extended European Search Report mailed Apr. 8, 2015 for European Patent Application No. 12833348.1, 8 pages.
XP-002737815, "Biaxially-stretched polyamide laminated film used for packaging e.g. foodstuffs, has layers contiaining polyamide having differing melting points, and is obtained by stretching in flow directino of film and right-angled direction", Database WPI, Week 201053, Thomson-Scientific, London, GB, Aug. 5, 2010, 2 pages.

*Primary Examiner* — Peter F Godenschwager
(74) *Attorney, Agent, or Firm* — Lee & Hayes, PLLC

(57) ABSTRACT

An extruded or molded article containing iron based oxygen scavenger, electrolytes, activated carbon, silica gel, or other water absorbing media, and optionally pore formers, is subjected to deformation to create voids or porosity, and subjected to water spraying or dipping to obtain a water activity of 0.4 or higher. The article is placed in a container or package containing oxygen sensitive articles.

15 Claims, 4 Drawing Sheets

METHODS OF MAKING OXYGEN SCAVENGING ARTICLES CONTAINING MOISTURE

BACKGROUND OF THE INVENTION

1. Technical Field

This disclosure relates to oxygen scavenging articles. More specifically, the disclosure relates to oxygen scavenging materials containing moisture and systems for and methods of making such articles 2. Description of Related Art Flexible food packaging materials such as used to form a plastic pouch usually require good oxygen barrier properties in order to prevent microbial growth and preserve the freshness of the food. This need can be exemplified by packages such as those for beef jerky, sausages, and processed meats, among others. A sachet containing an oxygen scavenger is commonly used in these type food pouches to absorb the head space oxygen and to absorb any oxygen permeating through the package wall. Sachets have been used for some time in ready-to-serve food packages, but they have potential disadvantages and limitations. For example, sachets are generally comingled with the food product, and thus may be accidentally ingested. Sachets also are susceptible to accidental piercing or cutting, which can lead to contamination of the food product. And, sachets are not aesthetically pleasing. In addition, sachets are not generally suited for use in packaging liquid products requiring oxygen scavenging.

As one conventional alternative to using sachets, it is known to purge the ambient air from a container and backfill the container with an inert gas, such as nitrogen. However, this process is costly and does not account for migration of oxygen into the package, for example, after sealing the package.

Extruded articles containing oxygen scavengers in the form of film, tape, ribbon or strands are known and may be advantageous in some packaging applications due to their powder-free construction and integral, usually one-piece format. However, such articles are generally not preferable in low-moisture applications, such as in packaging coffee, because there is insufficient ambient moisture to facilitate absorption of oxygen by the iron.

The following are documents identified by the inventor as relating generally to oxygen scavenging:

U.S. Pat. No. 5,896,994, issued Apr. 27, 1999 to WR Grace for "Sealed Articles," relates to an oxygen scavenging film strip disposed in a tray package containing oxygen sensitive articles.

U.S. Pat. No. 4,769,175, issued Sep. 6, 1988 to Mitsubishi Gas for "Sheet Like Oxygen Scavenging Agent," describes mixtures of fiber, iron powder, water, and electrolyte formed into a sheet-like product using a paper making process.

U.S. Pat. No. 4,317,742, issued Mar. 2, 1982 to Teijin for an "Oxygen Scavenging Composition, Heat-Generating Composition, And Heat-Generating Structure," teaches a heat generating composition capable of scavenging oxygen.

In view of the above-described deficiencies in the art, and shortcomings of the just-listed patents, there is a need in the art for an oxygen scavenger made from a film, tape or ribbon that contains a certain amount of moisture. There also is a need in the art for an oxygen scavenger having an adjustable amount of moisture therein, for example, such that the rate of oxygen scavenging in the container or package is controllable.

There also is a need in the art for an oxygen scavenging article that does not occupy large spaces, is functional and is easy to dispense.

There also is a need in the art for an oxygen scavenger suitable for operating at a water activity of 0.4 or lower, for example, as in connection with food products such as powdery coffee and dry infant food powder. Of noted interest, for example, it is desirable to preserve coffee aroma or flavor for single serving ready-to-brew cups that are approximately 30 cc or larger in volume. In a small food package, oxygen may deteriorate aroma or flavor due to oxidation.

There also is a need in the art for a non-leachable oxygen scavenger, which will not change the taste of the articles with which the scavenger is packaged.

There also is a need in the art for a solution to one or more of the aforementioned products that is a sustainable solution using materials of renewable resources and biodegradable in nature.

There also is a need in the art for an improved method of making an oxygen scavenger such as that described above.

SUMMARY OF THE INVENTION

The present invention remedies the foregoing needs in the art by providing an improved oxygen scavenging material containing water that can be readily formed for inclusion in myriad packaging applications.

In one aspect of the disclosure, a method of making an oxygen scavenging material includes stretching an oxygen scavenging material in at least one axial direction to form pores in the material and wetting the stretched material with a liquid such that the pores in the material retain a portion of the liquid.

The method may also include drying the stretched material after wetting to remove any moisture remaining on the surface.

In another aspect of the disclosure, a system for manufacturing an oxygen scavenging material includes a supply of oxygen scavenging material, a tool for stretching the supply of oxygen scavenging material in at least one axial direction, and a water supply for wetting the stretched oxygen scavenging material.

In another aspect, the system includes a dryer for drying the stretched material after wetting to remove moisture remaining on the surface.

In yet another aspect of the disclosure, an oxygen scavenger includes a stretched oxygen scavenging film having a plurality of pores therein; and a liquid retained in the pores.

These and other aspects and features of the invention will be appreciated from the following disclosure and attached figures, in which preferred embodimentps of the invention are described and illustrated.

BRIEF DESCRIPTION OF THE DRAWING FIGURES

DETAILED DESCRIPTION OF THE PREFERRED EMBODIMENT(S)

Figure 1:
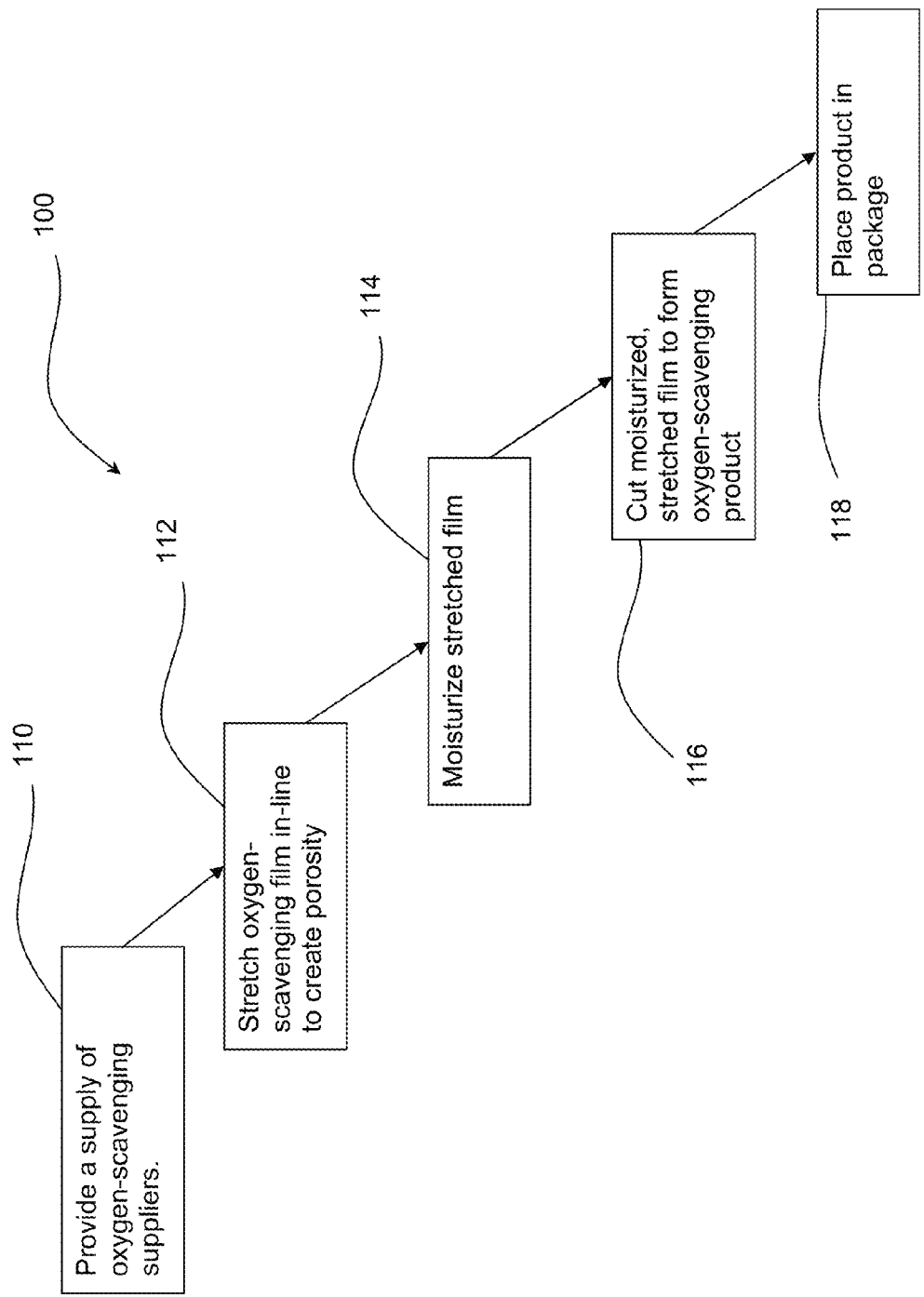
FIG. 1 is a flow chart illustrating a method of making a polymeric fabricated oxygen scavenger including moisture.

As noted above, the disclosure relates generally to a method of making polymeric fabricated articles containing oxygen scavengers and moisture. FIG. 1 describes a manufacturing process 110 according to an embodiment of the invention. In step 112 of the process, a supply of an oxygen scavenging material is provided. The oxygen scavenging material can be provided in many forms including but not limited to film, ribbon, and tape, and may be either in a packaged form for presentment, such as on a spool, or as a continuous web from machinery forming the material, such as an extruder, mold, or the like.

The oxygen scavenging material may comprise any number of compositions. In one embodiment it includes an iron-based oxygen scavenger, an inorganic salt such as NaCl which forms an electrolyte in water, and a moisture absorber such as activated carbon, silica gel, molecular sieve, or clay. The oxygen scavenging material also optionally includes mineral particles such as calcium carbonate as a pore former or a source of initiation of cavitation. When the oxygen scavenging material is formed as a ribbon, tape or film, it also includes a polymer such as polypropylene, polyethylene, or polylactic acid. Those of ordinary skill in the art, when enlightened by this disclosure will understand that other compositions of oxygen scavenging materials will be readily compatible with the process, systems and articles described herein.

In step 114, the provided oxygen scavenging material is stretched to form pores therein. In one embodiment, the oxygen scavenging material is stretched axially in one or more directions, resulting in the desired pore formation. For example, the film or sheet of oxygen-scavenging material can be uniaxially stretched using conventional machine directional orientation tools. It can also be biaxially stretched by machine directional orientation and transverse directional orientation tools to create voids or pores through deformation of pore formers. The draws ratio, defined as the ratio of the stretch length divided by the un-stretched length, can range from 1 to 100. The suitable draw ratio can be experimentally determined to create porosity for the particular formulation chosen. The pore or void size can range from submicron to a few millimeter. It is preferably ranging from 0.1 to 500 micron, more preferably ranging from 0.5 to 50 micron. The pores are preferably evenly distributed across the articles. They can be isolated or interconnected. They can be any shapes such as spherical, rectangular, triangular or multi-surfaced space. The pores can also be reticulated structure in which the open space is connected by fibrillated polymer structure such as that commonly seen in filter papers or filtration membranes. Pores can also be cavitation or voids as initiated by deformation around the included particles such as calcium carbonate or talc. By varying the characteristics of the pores, such as their morphology, shape, size and number, the liquid retention properties of the material can be controlled. Although as just described in connection with the embodiment illustrated in FIG. 1 the pores are voids formed by stretching, pores may be naturally occurring in the oxygen scavenging material, even without stretching. Pores are broadly understood to be any free volume in the oxygen scavenging material that is capable of retaining a liquid, as will be described in more detail below.

In the embodiment of FIG. 1, the stretched and porous material is then moistened in step 116. The moisturizer may be any liquid, but in one preferred embodiment is water. Other liquids used in the invention may include water and alcohol mixtures, glycerin, water and glycerin mixtures, and solutions including water, such as electrolytic solutions. The moisturizing may be done by spraying, perhaps as a vapor, the liquid onto the stretched and porous material or by introducing the material to a bath containing the liquid.

When the porous material is moistened, the pores retain some of that moisture, even if the material is subsequently dried to remove surface moisture. The stretched, porous, moistened material is subsequently cut in step 118 to form oxygen scavenging articles. Each of the articles is placed in a container requiring oxygen absorption in step 120.

The articles formed according to the process of FIG. 1 can be selectively manufactured to any number of specifications and for any number of uses. For example, the oxygen scavenging article may be fabricated in the form of a packet, a ribbon, a strand, a ring, a flat film, a sheet, a label, or an insert for use in a coffee package, e.g., a single-serve cup, such as a K-cup, bag, or container, to absorb residual oxygen in the package. In other embodiments, the articles could be formed as lid stocks or sealing layers.

In another embodiment, the oxygen scavenging fabricated article is fabricated in the form of a packet, a ribbon, a strand, a ring, a flat film, a sheet, a label, or an insert stored with infant food to absorb residual oxygen in the infant food package.

In fact, the invention is particularly useful in these applications because there is very little, if any, moisture in packages containing coffee and infant food. The oxygen scavenger already contains moisture, so it will absorb oxygen under these circumstances.

The manufacturing process described with reference to FIG. 1 also can be altered to provide desired results. For example, by controlling the amount of stretching, the porosity of the material can be varied, which in turn varies the amount of moisture retained by the material. The amount of moisture will have a direct impact on the rate of absorption of the oxygen scavenging article.

Moreover, and as noted above, the oxygen scavenging composition may be made according to many formulations, which can lead to varied performance results. In one embodiment, the composition includes a polymer, an oxygen scavenger, a salt, a moisture absorber, and a pore former. Additional components, such as surfactants also may be included.

Polymers useful for making the oxygen scavenging articles can include common polyolefins such as low density polyethylene, high density polyethylene, polypropylene, polystyrene, high-impact polystyrene, polycarbonate, polymethylmethacrylate and their derivatives or copolymers. They also may include sustainable or biodegradable polymers, which generally include all common polymers generated from renewable resources and biodegradable polymers, such as polylactic acid copolymers, starch-based polymers such as thermoplastics starch, polyhydroxyalkanoates, and polyhydroxybutyrate. Other biodegradable polymers may be petroleum-based polymers such as polyethylene oxide or polyvinyl alcohol.

The oxygen scavenger generally includes an iron powder. More specifically, the reduced iron powder preferably has 1-200 um mean particle size, more preferably 5-50 um mean particle size and most preferably 10-40 um mean particle size. The iron can be mixed with salt or a combination of different electrolytic and acidifying components. The iron particles can also be coated with salt. The combination and relative fraction of activating electrolytic and acidifying components coated onto the iron particles can be selected according to the teachings of U.S. Pat. No. 6,899,822, US Pat. applications 2005/0205841 and 2007/020456, incorporated herein by reference. The coating technique is preferably a dry coating process as described in the references above.

The salt can be any inorganic salt such as sodium-, potassium- or calcium-based ionic compounds that are soluble in water. Typical examples include NaCl, KCl, $Na_2HPO_4$ and others. A mixture of separate electrolytic and acidifying salt components can be advantageously used in the formulation as described in prior art.

The oxygen absorbing composition preferably also includes a moisture absorber, such as silica gel, activated carbon, molecular sieve, another sorbent material, or a combination thereof. For example, a mixture of the materials may include activated carbon and silica gel in a 50/50 mixture. The total loading can range from 2-80 wt %, preferably 5-60%, and more preferably 10-50%.

A pore former can also be used in the invention to promote formation of voids or pores during the stretching step. The pore former may be, for example, $CaCO_3$, talc, $Mg(OH)_2$, or some other mineral particle. The loading can range from 10-70%, and preferably from 20-50%. Typically, pore formers can be compounded separately with resin as master batches and fed into the extruder forming the polymeric oxygen scavenger. When a material containing a pore former is used, stretching of the oxygen scavenging material facilitates creation of micro-mechanical deformations around inorganic particles, such as around the pore former.

Surfactants also may be used in mixtures used to create the oxygen scavenger material. Some such surfactants useful for treating resin pellets or coated iron powders in order to maximize dispersion include lubricants such as mineral oil, fatty acids such as stearic acid, and low molecular weight compounds such as waxes.

Fillers, modifiers, or other materials generally known in the polymer film-making art, such as elastomers, coloring agents, or the like, also may be incorporated into the oxygen scavenging material.

A smaller size of composite oxygen scavenging particles (limited by small particle sizes producing significant light scattering and haze in films), comprising all necessary components for efficient oxidation, produces oxygen scavenging films with higher effective reactivity with permeating oxygen and allows for a more efficient design of barrier structures.

In addition, while mixtures according to the foregoing disclosure may be formed into a single layer film, barrier film reactivity is in some instances advantageously improved by multilayer structural designs where the oxygen scavenging layer such as made according to the foregoing mixtures forms the middle layer of a three-layer structure made from the same matrix resin. The specific optimal layer thickness ratios depend on the overall film thickness and the oxidation kinetics of the activated scavenger.

The three-layer film structure preferably has a layer ratio in the range of 49/2/49 and 1/98/1, with an optimum ratio, depending on the design target (such as the rate of headspace oxygen absorption) may be about 40/20/40. The iron is preferably located in the middle of the three layers. The outer layers may be any known oxygen permeable construction.

Films to be used as labels, laminates or inserts for a pouch may consist of single or multilayer structure with the coated iron uniformly distributed in the film or in the chosen layer(s). For a multilayer structure, the coated iron is preferably located in the middle of the structure. It can be located adjacent to the external layer to facilitate absorption. In other embodiments, a layered structure according to the invention may include an absorptive layer including iron disposed on a backing or substrate, such as a PET substrate. The substrate may be chosen for its aesthetics, for example, because it may be more readily printed on or has an otherwise more desirable surface characteristic. The substrate also may be chosen for its barrier properties or for its ability to act as a removable layer, such as when the oxygen scavenger is an adhesive label. Handling may also dictate the use and structure of the barrier layer.

Figure 2:
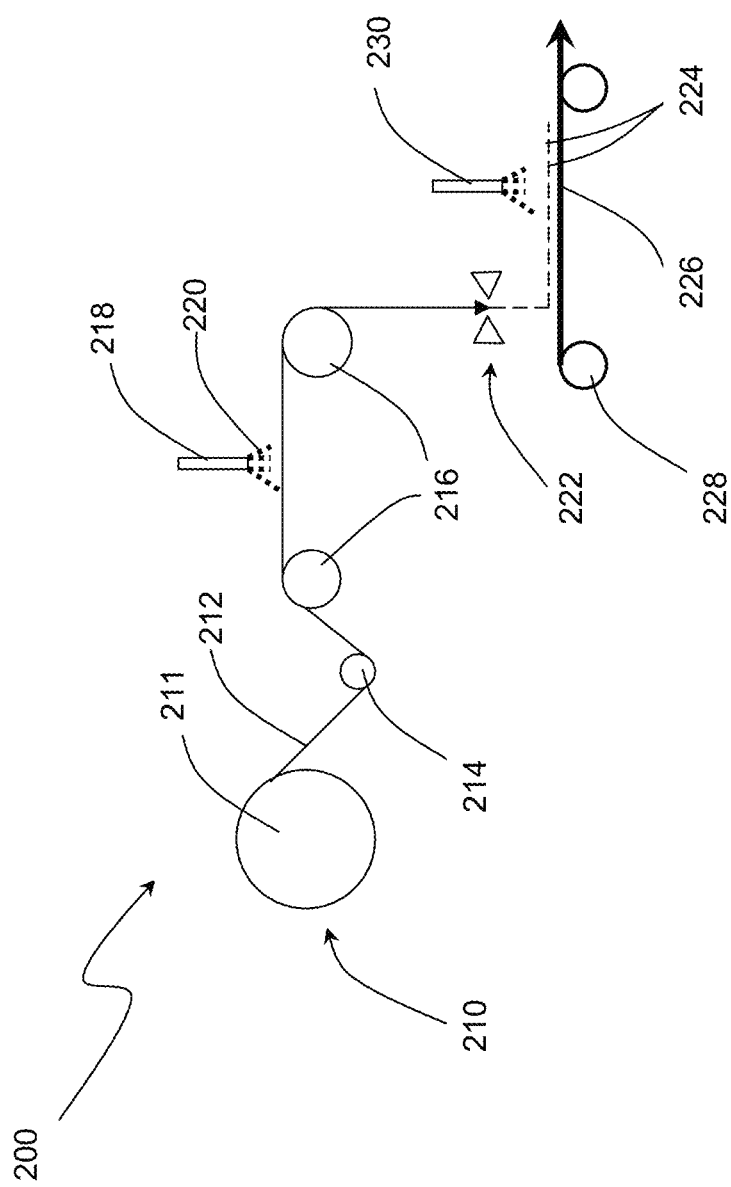
FIG. 2 is a schematic representation of a system for creating an oxygen scavenging film containing moisture according to one embodiment of the invention.

FIG. 2 is a schematic representation of a system 200 for forming oxygen scavenging articles using a process similar to that described in connection with FIG. 1. The system 200 generally includes a supply 210 of an oxygen-absorbing polymeric material 212. In the illustration, the supply 210 is a spool 211 about which the material 212 is disposed. In other embodiments, the material 212 may be provided directly from the machine making the material, such as an extruder or mold.

In FIG. 2, the material 212 is provided as a continuous web fed from the spool 211 through a conveyance path. First, the material is acted upon by a stretching tool 214, which, as noted above, may be a conventional MDO or TDO tool. Once stretched the material 212 is delivered, for example, with the assistance of rollers 216, proximate a moisturizer 218. The moisturizer 218 provides a liquid 220 to the material 212. Although only one moisturizer is shown in FIG. 2, disposed above the material 212 for moisturizing a top surface of the material, additional moisturizers could be present and placed in a multitude of locations, including beneath the material 212.

Once moisturized, the material 212 is conveyed to a cutter 222 that cuts the material 212 into a plurality of discrete oxygen scavenging articles 224. The oxygen scavenging articles 224 may be ready for use after cutting, or they may undergo further processing. For example, as shown in FIG. 2, the articles 224 may be placed on a conveyor 226, driven by a series of rollers 228, to be presented to a dryer 230 for removing surface water. The conveyor 226 preferably transports the articles 224 for direct packaging into a container in which oxygen is undesirable, or to a staging area, such as a bag, having limited oxygen. Once wet, the articles 224 are active, so it is important to maintain them in a low-to-no oxygen environment until use.

Figure 3:
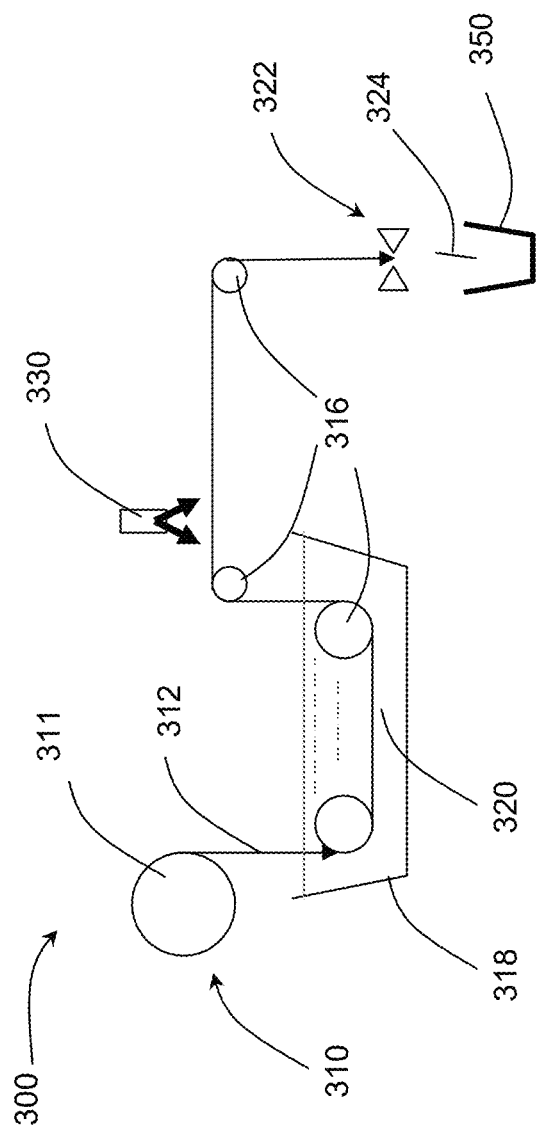
FIG. 3 is a schematic representation of a system for creating an oxygen scavenging film containing moisture according to another embodiment of the invention.

FIG. 3 shows a system 300 slightly different from the system of FIG. 2. In FIG. 3, a continuous web of oxygen scavenging material 312 is provided on a supply 310, which is a spool 311 in the illustrated embodiment. In this embodiment there is no stretcher and the oxygen scavenging material is fed, by a series of rollers 316 or the like, to a moisturizing bath 318 containing a liquid 320. The web of material is conveyed through the bath 318 while submerged in the liquid 320 to allow pores in the material or the material itself, e.g. by way of the silica gel or similar moisture retaining material, to retain some of the liquid 320. Because the material is not stretched in the illustrated embodiment, the film may be required to be left in the bath 318 for a (relatively longer) time sufficient to allow the liquid to permeate the oxygen scavenging material 312 and occupy pores therein. In another embodiment the web may be stretched prior to wetting using an MDO or a TDO machine, as in the embodiment described in connection with FIG. 2. Whether stretched or not, the material used in these embodiments may be a single layer or a multi-layer, as described above.

The moistened material 312 is subsequently subjected to a dryer 330 to remove surface liquid remaining after the bath 318. Once dried, the material 312 is cut by a cutter 322 to form discrete oxygen scavenging articles 324. After moistening, the oxygen scavenging material 312 is active, so the articles 324 are preferably quickly cut and placed in a subsequently-sealed container 350. The container 350 may be the container of ultimate use for the product, or may be an interim container that is preferably oxygen-free so as to maintain efficacy of the article 324. Again, the wetted material may be a single layer, having a structure like that described above or some similar structure, or may have multiple layers.

Whether the material used is stretched or not, and whether a single or multiple layers are used, the composition of the oxygen absorbing layer may be adjusted to achieve desired performance. For example, when the material is not to be stretched, additional silica gel or other similar water retention material may be incorporated with the pore former being reduced, even to the point of elimination. Similarly, the number of pores can be varied by including more or less of the pore former. Pore size can also be increased by additional stretching of the material.

Figure 4:
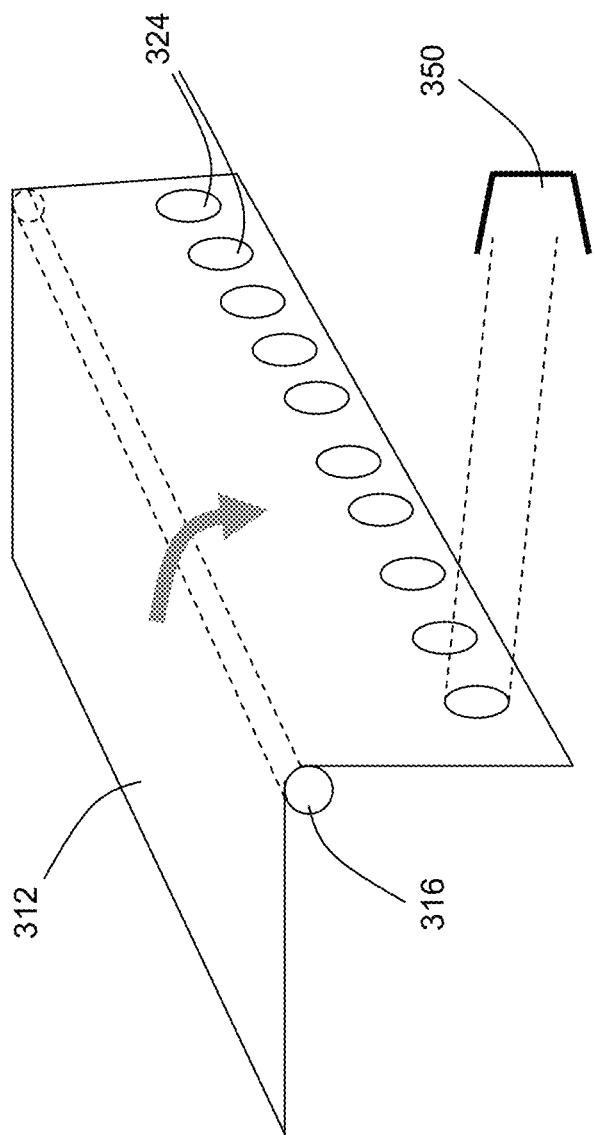
FIG. 4 is a schematic representation of a multi-cavity die-cut and dispensing apparatus which may be used in embodiments of the invention.

FIG. 4 is a schematic representation of the system in which the cutter 322 is a die cutter that forms the discrete oxygen scavenging articles 324 as circular discs from the moisture-retaining material 312. As shown, a row of oxygen scavenging discs may be formed at the same time, and, although only one container 350 is shown, a plurality of containers 350 preferably are arranged, each for receipt of one of the articles 324.

The inventor also has conducted an experiment including aspects of the above-described disclosure, which is described as follows:

Example 1

Preparation of Oxygen Scavenging Films Containing Porosity and Moisture Absorbers A 15-mil film that contains an oxygen scavenger formulation was prepared by extruding a mixture of polypropylene, a modifier, iron, talc, and silica gel. The polypropylene was a homopolymer commercially available as Dow H110-02N. The modifier was a propylene-based elastomer commercially available from ExxonMobil as Vistamaxx™ VM6102, which can be used with polypropylene to enhance its performance in certain applications, such as in forming films. The iron was an iron and salt combination made according to the teachings of U.S. Patent Application Publication No. 2010/0255231 to Chau et al. for oxygen scavenging films, the disclosure of which is hereby incorporated by reference. The talc was a commercially available talc sold by Luzinac as Jetfill 700 and the silica gel was a commercially available silica gel having a 5 micron average particle size. The weight ratio for the mixture was polypropylene/Vistamaxx/iron/talc/silica gel=25/25/10/30/10.

The mixture was extruded in a twin screw extruder at an average temperature of 250° C. for the extruder and die to form a 5-inch wide 15 mil thick sheet. The sheet was collected on a winder. One-inch-wide samples were cut from the sheet and subsequently stretched using an Instron tensile tester at 1/min strain rate to approximately 300% elongation, creating porosity or voids in the samples. The films appeared to show some stress-whitening and opaqueness after stretching. The film stripes were subsequently immersed in water for 30 min and, in this experimental process, blot-dried briefly to remove the surface water. The wetted sample was found to have a water activity of approximately 0.7, different from the 0.4 of the unstretched, non-wetted film.

The samples were cut into one- to two-inch pieces and weighted to achieve approximately 3.5 gm for both the as-extruded and stretched pieces. These cut pieces were tested for oxygen scavenging performance using a pouch test. More specifically, the cut samples were sealed in a high gas barrier bag and the bag was injected with 300 cc of $O_2/N_2$ mixture to achieve a starting oxygen level of approximately 4.7-5%. The oxygen absorption rate was measured using a MOCON Pac-Check Model 450 Head Space Analyzer at various times at room temperature. The oxygen absorbed by the samples at these times is shown in Table-1. The data showed that the stretched and stress-whitened samples had higher absorption rate than the un-stretched, control film, despite both being wetted.

TABLE 1

Oxygen absorption for the stretched films containing sorbents and oxygen scavenger

| Sample | Film thickness mil | Time hrs | O2 absorbed cc/gm of film |
|---|---|---|---|
| As extruded | 14.5 | 0 | 0 |
|  |  | 14.5 | 1.04 |
|  |  | 24 | 1.69 |
|  |  | 48 | 2.64 |
| Stretched | 13 | 0 | 0 |
|  |  | 14.5 | 1.71 |
|  |  | 24 | 2.55 |
|  |  | 48 | 3.49 |

The foregoing embodiments of the present invention are provided as exemplary embodiments and are presently best modes for carrying out the invention. Modifications of these embodiments will be readily apparent to those of ordinary skill in the art. The invention is not intended to be limited by the foregoing embodiments, but instead is intended to be limited only by the appended claims.

The invention claimed is:

1. A method of making an oxygen scavenging material comprising:
   providing a film containing an oxygen scavenger;
   stretching the film to obtain a stretched film; and
   wetting the stretched film with a liquid such that pores disposed in the material retain a portion of the liquid.

2. The method of claim 1, further comprising drying the stretched film after the wetting step.

3. The method of claim 1, wherein the film containing the oxygen scavenger comprises an oxygen scavenger, a salt, a moisture absorber, and a polymer.

4. The method of claim 3, the film comprising a bonding agent and a pore former.

5. The method of claim 3, wherein the film is extruded from a mixture of the oxygen scavenger, the salt, the moisture absorber, and the polymer.

6. The method of claim 1, wherein the stretching the material comprises using one of a machine directional orientation tool and a transverse directional orientation tool.

7. The method of claim 1, further comprising cutting the wetted film.

8. The method of claim 7, wherein the cutting comprises die cutting.

9. The method of claim 1, further comprising forming an article from the wetted film.

10. The method of claim 9, wherein the article is one of a packet, a ribbon, a strand, a ring, a flat film, a sheet, a label, an insert, lid stock, or a sealing layer.

11. The method of claim 1, further comprising drying the wetted stretched film.

12. The method of claim 1, further comprising providing at least one additional film layer on the wetted stretched film.

13. The method of claim 1, wherein the wetting the stretched film comprises wetting the stretched film with a moisturizer.

14. The method of claim 1, wherein the wetting the stretched film comprises exposing the material to a bath.

15. The method of claim 1, wherein each of the pores is between about 0.1 micron and 500 micron.

\* \* \* \* \*